Oct. 13, 1936.      P. C. PETERSEN      2,057,205
COMBINATION BEARING AND SEALING MEANS FOR ROTARY PUMPS
Filed Oct. 24, 1935
Fig. 1.
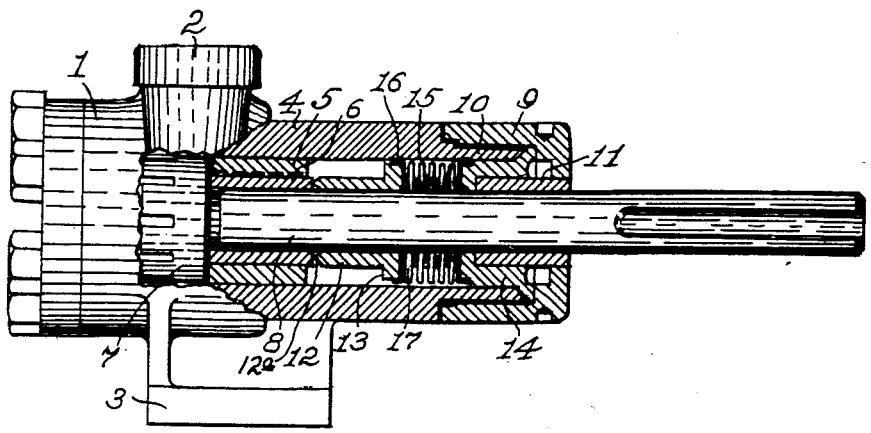
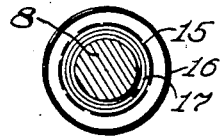
Fig. 2.
Inventor
Peter C. Petersen,
By G. C. Kennedy,
Attorney Patented Oct. 13, 1936

2,057,205

UNITED STATES PATENT OFFICE 2,057,205

COMBINATION BEARING AND SEALING MEANS FOR ROTARY PUMPS

Peter C. Petersen, Cedar Falls, Iowa, assignor to Viking Pump Company, Cedar Falls, Iowa, a corporation of Delaware Application October 24, 1935, Serial No. 46,535

2 Claims. (Cl. 308—36.2)

My invention relates to improvements in combination bearing and sealing means for a rotary pump, and an object of my improvements is to supply for the rotor shaft of such a pump, combination bushings therefor combined with a loosely mounted doubly-beveled end sleeve, and including end-closing means, with an intermediate assemblage of a flexibly collapsible and expansible bellows sealing device having a resilient controlling means therefor, whereby a non-leakable self-adjusting bearing means is provided for the rotor shaft.

This object I have accomplished by the means which are hereinafter described and claimed, and which are illustrated in the accompanying drawing. Fig. 1 is a side elevation in part of a rotary pump, other parts being broken away or shown in vertical axial section, with the rotor and its spindle or shaft shown in elevation. Fig. 2 is a cross section of the spindle, with bellows.

The numeral 1 denotes the cylinder body of a rotary pump, having the usual front cover removably mounted thereon, having an inlet member 2 and a base part 3. The body 1 also has a rearwardly extending hollow cylindrical portion 4 in the forward part of whose hollow is mounted a casing bushing 5, the rotor head 7 being shown within the cylinder part 1. The rotor has a rearwardly extending spindle shaft 8 whose forward part has a sleeve 6 fixed thereon within the casing bushing 5. A flanged seal bushing 12 with a flange 13 is loosely mounted on the spindle 8 for slight oscillation, and has one end with double bevel 12a engaging the right-angled rear end of the sleeve 6. A seal nut 14 is mounted within the diminished rear end part 10 of the part 4 and within the hollow of this seal nut an oilite bushing 11 is mounted around the spindle 8. The sleeves 6 and 11 are the bearings for the shaft 8. A hollow closure nut 9 is removably mounted upon the diminished rear part 10 of the body part 4.

In the interspace of the sleeve 12 and the seal nut 14 is mounted around the spindle 8 and spaced therefrom a thin flexible and resilient metal sealing bellows 15, having outwardly projecting end flanges 16 seated in contact around the adjacent outer walls of the flange of the seal sleeve 12 and around an annular seat in the nut 14 respectively. A spiral compression spring 17 is seated around the spindle 8 within the bellows 15 and engaging resiliently the sleeve 12 and the seal nut 14.

The closure nut 9 may be used to engage a flange on the seal nut 14, thus preventing seepage of a lubricating liquid into the hollow of the body part 4, or to escape past the oilite bushing 11 on one hand, or into the rotor chamber 1 on the other.

I have shown a preferred embodiment herein of my invention, but it is obvious that the invention may be varied in detail without departing from my invention or the scope of protection of the appended claims.

As the rotor 7 and its shaft 8 rotate rapidly with some oscillation, the flanged sleeve 12 being loose for slight play on the shaft, the doubly beveled end of the sleeve 12 as shown at 12a is always kept in contact with the right-angled abutting end of the sleeve 6, and does not spread therefrom because of the action of the spring 17, making thus close connections between these sleeves at their contacting ends, preventing leakage therebetween. The end nut 9 presses upon the flange of the sleeve 14, which is beveled to fit the beveled end of the diminished part 10 of the body cylinder bearing 4, to make a non-leaking joint therebetween.

It will be seen, that when the end nut 9 is removed, the above described elements around the shaft 8 may be removed easily and quickly, and as readily returned or replaced by others. The sealing of the cavity of the body 4 around the shaft 8 is by the above means made effective and continuous during the operation of the pump at high speed, as the spring 17 actuates the sleeve 12 to keep its joint with the sleeve 6 tight, while the joint is also kept tight against seepage by the end nut 9 compelling the beveled flange on the nut 14 to seal it upon the beveled termination of the body part 10.

I claim:

1. In a rotary pump with a hollow casing prolongation, a rotor shaft traversing said prolongation, spaced flanged sleeves loosely, non-rotatably slidable on said shaft, resilient means between and bearing on said sleeves, collapsible flexible sealing means surrounding said resilient means and sealed to said sleeves, a sleeve fixed on said shaft contacting with and sealing the adjacent end of one of the last mentioned sleeves, and a cap-nut on said prolongation sealingly engaging the flange on the other of said flanged sleeves to lock it releasably and sealingly upon the prolongation and to hold said resilient means under compression between the flanged sleeves.

2. In a rotary pump with hollow bearing prolongation, a rotor shaft loosely traversing the said prolongation, the rotor having a sleeve mounted on said shaft with a terminal wall perpendicular to the shaft, a flanged sleeve loosely slidably and non-rotatably mounted on the shaft and having an end with a double reversed bevel engaging the said end wall of the first sleeve to permit oscillation of the second sleeve slightly relative thereto sealingly, a second flanged sleeve slidably non-rotatably mounted on the shaft and spaced from the first flanged sleeve, flexible sealing means end sealed to and between said flanged sleeves, resiliently reactive means engaged between said flanged sleeves, the second mentioned flanged sleeve having an outer beveled annulus therearound and the end of said prolongation having a beveled end to fit said beveled annulus, and a cap-nut on said prolongation having an inner shoulder to engage the outer wall of said beveled annulus to sealingly lock them together at their joint.

PETER C. PETERSEN.